US012366117B2

(12) United States Patent
Park et al.

(10) Patent No.: US 12,366,117 B2
(45) Date of Patent: Jul. 22, 2025

(54) SAFETY DEVICE FOR LADDER

(71) Applicant: IKAMPER CO., LTD., Paju-si (KR)

(72) Inventors: Soon Gyu Park, Paju-si (KR); Sung Suk Ha, Paju-si (KR)

(73) Assignee: IKAMPER CO., LTD., Paju-si (KR)

( * ) Notice: Subject to any disclaimer, the term of this patent is extended or adjusted under 35 U.S.C. 154(b) by 1142 days.

(21) Appl. No.: 17/257,010

(22) PCT Filed: Dec. 23, 2020

(86) PCT No.: PCT/KR2020/019010
§ 371 (c)(1),
(2) Date: Dec. 30, 2020

(87) PCT Pub. No.: WO2021/206268
PCT Pub. Date: Oct. 14, 2021

(65) Prior Publication Data

US 2022/0049550 A1 Feb. 17, 2022

(30) Foreign Application Priority Data

Apr. 6, 2020 (KR) ........................ 10-2020-0041383

(51) Int. Cl.
*E06C 7/18* (2006.01)
*E06C 1/06* (2006.01)
(Continued)

(52) U.S. Cl.
CPC .................. *E06C 7/18* (2013.01); *E06C 1/06* (2013.01); *E06C 1/38* (2013.01); *E06C 7/081* (2013.01)

(58) Field of Classification Search
CPC . E04H 4/144; E04H 4/06; E06C 7/006; E06C 7/16
See application file for complete search history.

(56) References Cited

U.S. PATENT DOCUMENTS 221,780 A * 11/1879 Clark ........................ E06C 7/16 248/238
1,198,739 A * 9/1916 Marciniak et al. ..... E06C 1/005 182/29
(Continued)

FOREIGN PATENT DOCUMENTS

DE 202011102506 U1 * 12/2011 ............. E06C 7/006
JP 2000303765 A * 10/2000
(Continued)

OTHER PUBLICATIONS

Translation of DE_202011102506.*
(Continued)

*Primary Examiner* — Colleen M Chavchavadze
(74) *Attorney, Agent, or Firm* — Maier & Maier, PLLC

(57) ABSTRACT

A safety device for a ladder for protecting a user of the ladder is provided. The safety device includes a guard member formed extending in one direction, the guard member being mountable on the ladder, and a plurality of fixing members connected to the guard member, spaced apart from each other along a longitudinal direction of the guard member, and configured to fix the guard member to the ladder, wherein the guard member is configured to protrude at least partially toward a mar side of the ladder and cover a rear surface of the ladder.

10 Claims, 5 Drawing Sheets

(51) Int. Cl.
*E06C 1/38* (2006.01)
*E06C 7/08* (2006.01)

(56) References Cited

U.S. PATENT DOCUMENTS

| | | | | | | |
|---|---|---|---|---|---|---|
| 3,503,468 | A | * | 3/1970 | Taylor, Sr. | E06C 7/16 | 182/121 |
| 4,126,206 | A | * | 11/1978 | Becnel | E06C 7/006 | 182/230 |
| 4,211,307 | A | * | 7/1980 | Ethridge | E06C 7/16 | 182/121 |
| 4,241,807 | A | * | 12/1980 | McKenna | E06C 7/16 | 182/121 |
| 4,687,075 | A | * | 8/1987 | Skaggs | E06C 7/16 | 248/238 |
| 4,804,063 | A | * | 2/1989 | Farris | E06C 7/16 | 182/228.2 |
| 4,805,736 | A | * | 2/1989 | Byrnes, Jr. | E06C 9/08 | 182/95 |
| 4,941,547 | A | * | 7/1990 | Livick | E06C 7/48 | 182/229 |
| 5,072,808 | A | | 12/1991 | Spalt et al. | | |
| 5,191,954 | A | * | 3/1993 | Ledford | E06C 7/16 | 248/210 |
| 5,429,205 | A | * | 7/1995 | Collins | E06C 7/16 | 248/238 |
| 5,682,960 | A | * | 11/1997 | Mobley | E06C 7/00 | 182/129 |
| 6,109,392 | A | | 8/2000 | Merrick | | |
| 7,717,231 | B2 | * | 5/2010 | Horton | E06C 7/006 | 182/106 |
| 7,793,759 | B1 | * | 9/2010 | Aiken, Jr. | E06C 7/006 | 182/106 |
| 10,920,492 | B2 | * | 2/2021 | Shattuck | E06C 1/24 | |
| 2006/0076188 | A1 | * | 4/2006 | Horton | E06C 7/006 | 182/106 |
| 2017/0101821 | A1 | | 4/2017 | Shattuck et al. | | |
| 2017/0260811 | A1 | * | 9/2017 | Trudeau | E04H 4/144 | |
| 2021/0148170 | A1 | * | 5/2021 | Nelson | E04H 4/14 | |

FOREIGN PATENT DOCUMENTS

| | | | | |
|---|---|---|---|---|
| JP | 3821836 | B1 | * | 9/2006 |
| JP | 2006312867 | A | * | 11/2006 |
| JP | 2020007792 | A | * | 1/2020 |
| KR | 20100024785 | A | * | 8/2008 |
| KR | 10-2010-0024785 | A | | 3/2010 |
| KR | 20130000294 | U | * | 7/2011 |
| KR | 20-2013-0000294 | U | | 1/2013 |
| KR | 10-2016-0075423 | A1 | | 6/2016 |
| KR | 20160075423 | A | * | 6/2016 |
| KR | 20-2018-0000801 | U | | 3/2018 |

OTHER PUBLICATIONS

Office Action of Canadian Patent Application No. 3,106,181 mailed May 25, 2022.

Written Opinion of the International Searching Authority of PCT/KR2020/019010 mailed Mar. 31, 2021.

* cited by examiner

[Fig. 1]
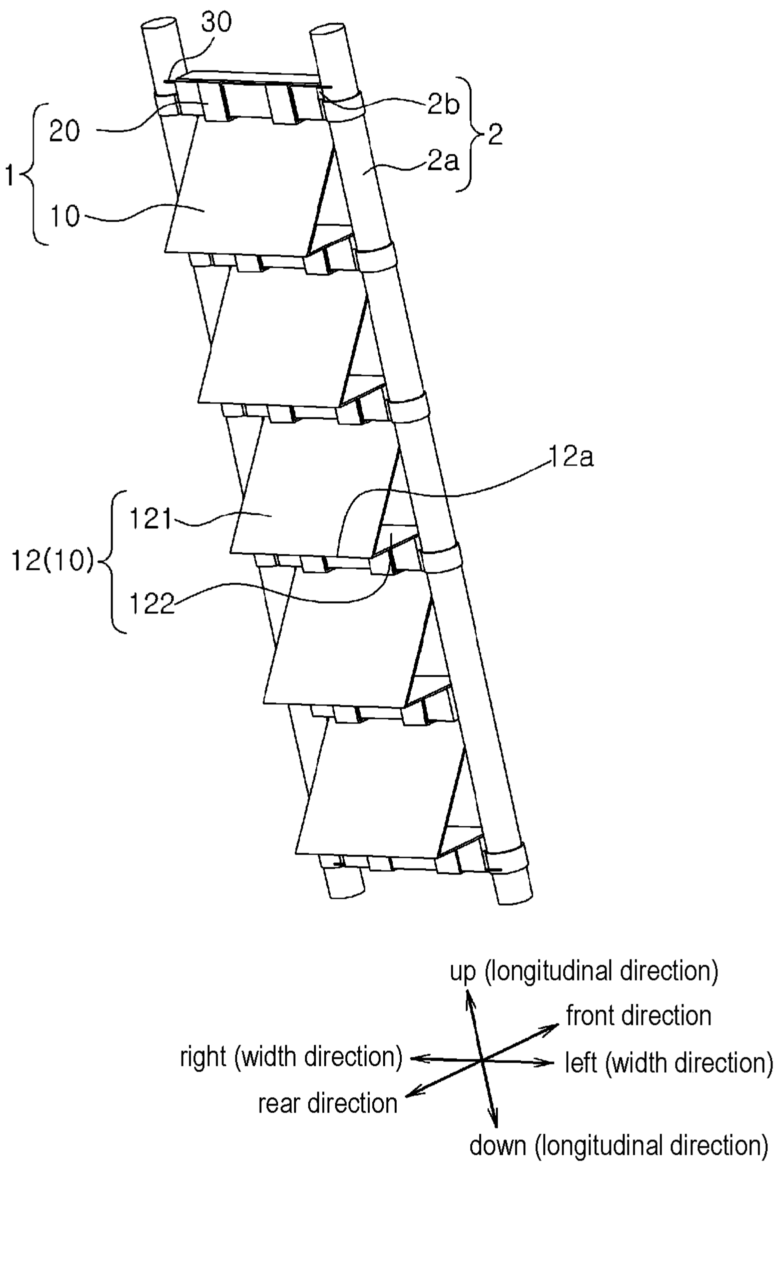

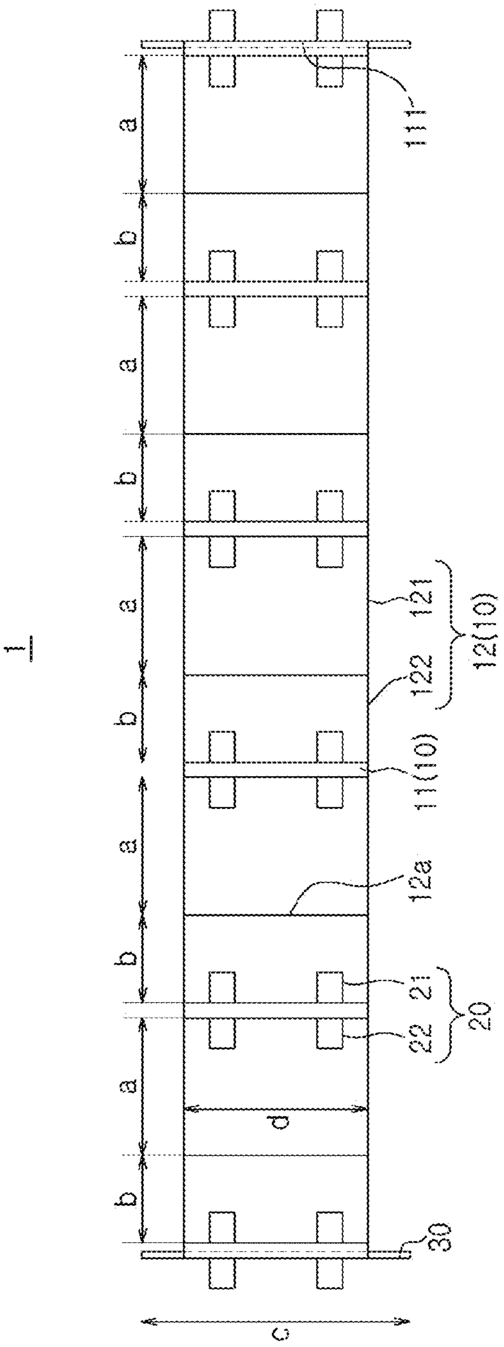
[Fig. 2]

[Fig. 3]
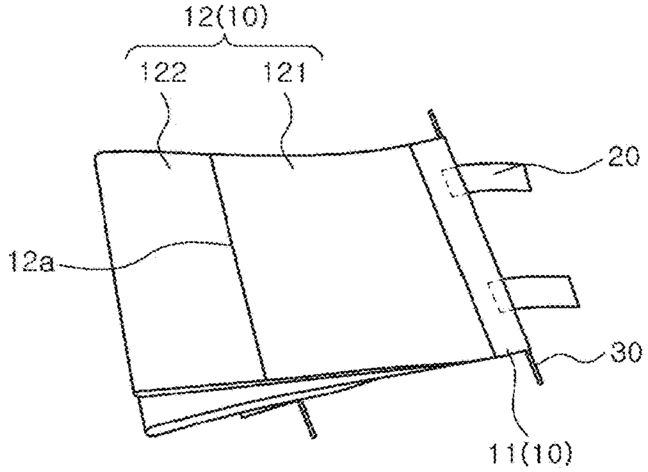
[Fig. 4]
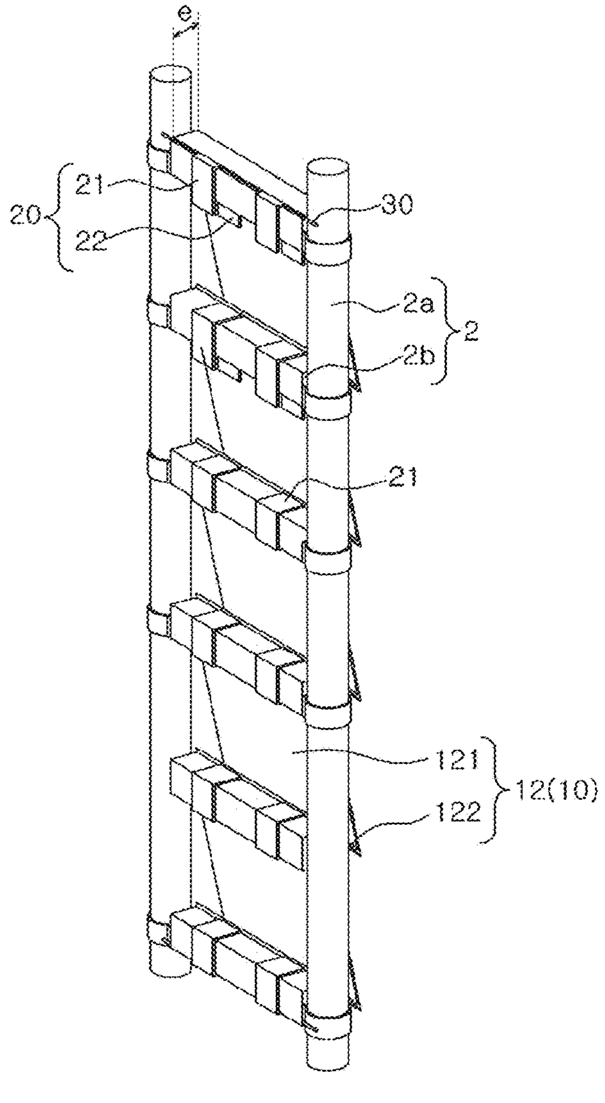

[Fig. 5]
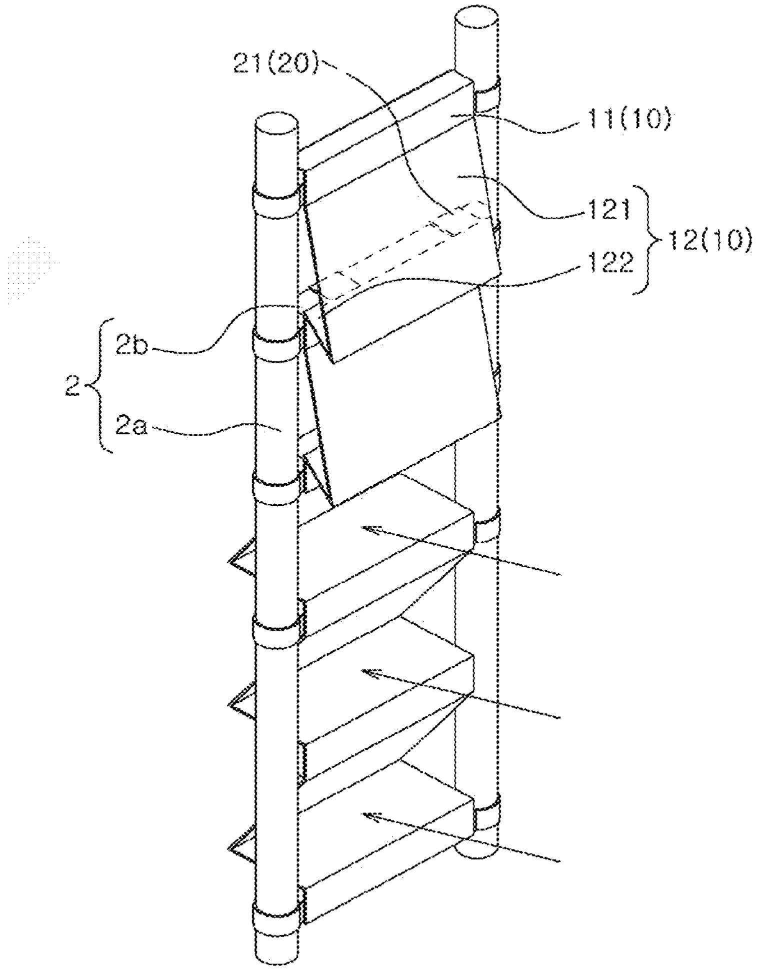

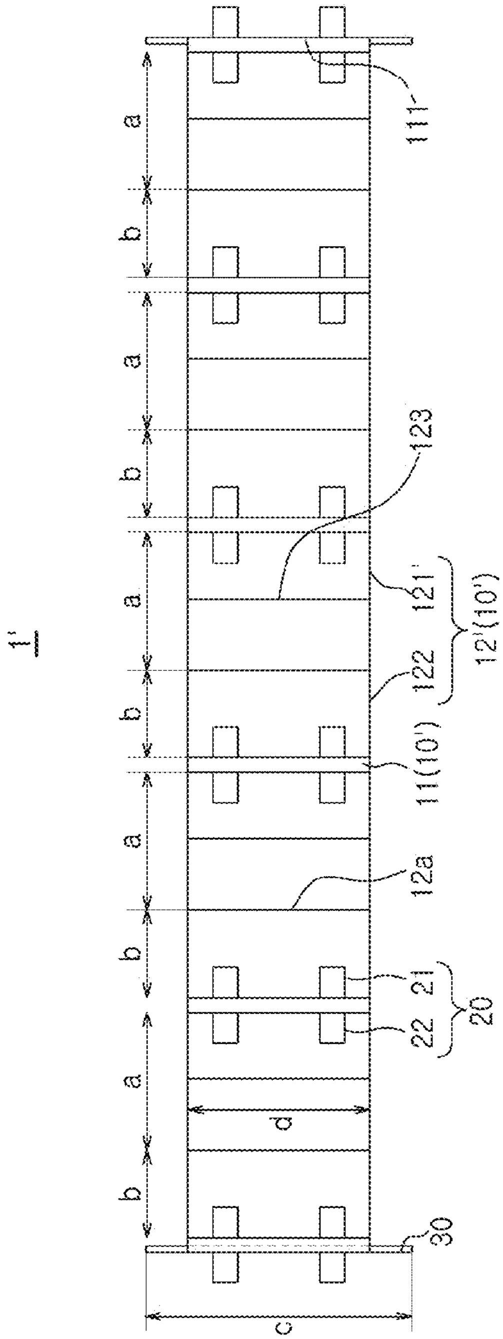
[Fig. 6]

SAFETY DEVICE FOR LADDER

TECHNICAL FIELD

The present disclosure relates to a safety device for a ladder.

BACKGROUND ART

In general, a ladder is an auxiliary moving means used when moving up to a high place or moving down to a low place. The ladder enables a user to easily and quickly move between various types of facilities having a difference in floor height.

Such a ladder consists of a pair of vertical supports having a preset length and arranged in parallel with each other at a predetermined interval, and a plurality of horizontal supports fixedly installed at predetermined intervals between the pair of vertical supports.

DISCLOSURE OF INVENTION

Technical Problem

However, in the case of the conventional ladder, in the process of moving the ladder to a desired position while repeating the user's motion of holding the vertical supports with the hands and stepping on the horizontal supports with the feet, accidents occur frequently that the vertical supports held by the hands are missed or the feet slip and fall from the horizontal supports. Accordingly, in order to prevent a safety accident that may occur to a user in the process of using the ladder, various types of safety devices for ladders have been proposed.

However, the conventional safety device for a ladder has as very complicated configuration, which poses a problem that a lot of time is taken to install the safety device on the ladder and the storage of the safety device is cumbersome.

Accordingly, there is a need for research on a safety device for a ladder which can be conveniently installed on a ladder, can be easily stored, and can prevent a user's safety accident that may occur when using the ladder.

Solution to Problem

According to one aspect of the present disclosure, there is provided a safety device for a ladder for protecting a user of the ladder, comprising a guard member formed extending in one direction, the guard member being mountable on the ladder and a plurality of fixing members connected to the guard member, spaced apart from each other along a longitudinal direction of the guard member, and configured to fix the guard member to the ladder, wherein the guard member is configured to protrude at least partially toward a rear side of the ladder and cover a rear surface of the ladder.

Advantageous Effects of Invention

The embodiments of the present disclosure have been conceived to solve the problems of the related art, and provide a safety device for a ladder which can be conveniently installed on a ladder, can be easily stored, and can prevent a user's safety accident that may occur when using the ladder.

The safety device for a ladder according to the embodiments of the present disclosure can be conveniently installed on a ladder, can be easily stored, and can prevent a user's safety accident that may occur when using the ladder.

BRIEF DESCRIPTION OF DRAWINGS

FIG. 1 is a perspective view showing a state in which a safety device for a ladder according to an embodiment of the present disclosure is mounted on a ladder.

FIG. 2 is a plan view showing the safety device for a ladder shown in FIG. 1.

FIG. 3 is a perspective view showing a state in which the safety device for a ladder shown in FIG. 1 is folded.

FIGS. 4 and 5 are views for explaining a process of mot ting the safety device fear ladder shown in FIG. 1 on a ladder.

FIG. 6 is a plan view showing a safety device for a ladder according to another embodiment of the present disclosure.

MODE FOR THE INVENTION

Hereinafter, specific embodiments for implementing the spirit of the present disclosure will be described in detail with reference to the drawings.

In addition, in describing the present disclosure, if it is determined that a detailed description of a related known configuration or function may obscure the subject matter of the present disclosure, the detailed description thereof will be omitted.

In addition, when one component is referred to as being 'connected' to another component, it should he understood that one component may be directly connected to another component and a further component may exist between one component and another component.

The terms used in the subject specification only used to describe specific embodiments, and are not intended to limit the present disclosure. Singular expressions include plural expressions unless the context clearly indicates otherwise.

In addition, in the subject specification, expressions such as one side, the other side, and the like are defined with reference to the illustration in the drawings. It should be noted that if the direction of the corresponding object is changed, the object may he expressed differently. For the same reason, some components in the accompanying drawings are exaggerated, omitted, or schematically illustrated. The size of each component does not thoroughly reflect the actual size.

In addition, the terms including ordinal numbers such as first and second may be used to describe various components, but the corresponding elements are not limited by such terms. These terms are only used for the purpose of distinguishing one component from another.

The meaning of 'comprise' as used in the specification specifies a specific characteristic, region, integer, step, operation, element and/or component, and does not exclude the existence or addition of other specific characteristic, region, integer, step, operation, element, component and/or group.

Hereinafter, a specific configuration of a safety device for a ladder according to an embodiment of the present disclosure will be described with reference to the drawings.

Referring to FIGS. 1 to 3, the safety device 1 for a ladder according to an embodiment of the present disclosure is a device for protecting the safety of a user who uses a ladder 2. The safety device 1 may include a guard member 10, a plurality of fixing members 20 and a reinforcing member 30.

Meanwhile, for the convenience of explanation, first, the ladder 2 will be briefly described. The ladder 2 may include a pair of vertical supports 2*a* having a preset length and arranged in parallel with each other at a predetermined interval, and a plurality of horizontal supports 2*b* fixedly installed at predetermined intervals between the pair of vertical supports 2*a*.

The guard member 10 may be provided so as to be mountable to the ladder 2. At least a portion of the guard member may be provided to protrude to the rear side of the ladder 2 to cover the rear surface of the ladder 2. At this time, at least a portion of the guard member 10 may protrude to the rear side of the ladder 2 by an external force applied from a user in a state in which the guard member 10 is mounted on the ladder 2 so as to cover the front surface of the ladder 2. In this regard, the front surface of the ladder 2 means the −y axis direction in FIG. 1, and the rear surface of the ladder 2 means the +y axis direction in FIG. 1.

The guard member 10 may extend in one direction. For example, the guard member 10 may be made of a fiber material capable of achieving an anti-slip effect. In this regard, one direction means the ±z-axis direction in FIG. 1.

Meanwhile, the guard member 10 may include a connection portion 11 to which the fixing members 20 are connected and a cover portion 12 provided at at least one end of the connection portion 11 and provided with a folding line 12*a* extending in the other direction perpendicular to one direction. In this regard, the other direction means the ±x-axis direction in FIG. 1.

In this case, the connection portion 11 and the cover portion 12 may be integrally formed. In addition, the connection portion 11 and the cover portion 12 may he provided in plurality. The plurality of connection portions 11 and the plurality of cover portions 12 may be arranged alternately with each other.

The connection portion 11 is a portion to which the fixing members 20 are connected, and may be disposed between two cover portions 12 adjacent in one direction. The cover portion 12 may be provided on at least one of one side and other side of the connection portion 11.

The cover portion 12 may he selectively unfolded to cover the rear surface of the ladder 2 and may serve as a footrest on which a user can step. To this end, the cover portion 12 may he provided at at least one end of the connection portion 11.

The cover portion 12 may he selectively unfolded about the folding line 12*a*. For example, the cover portion 12 may be used by being unfolded about the folding line 12*a*. When there is no need to use the cover portion 12, the cover portion 12 may be stored by being folded about the folding line 12*a*. When the cover portion 12 is unfolded about the folding line 12*a*, the cover portion 12 may protrude to the rear side of the ladder 2 through an opening existing between the two horizontal supports 2*b* adjacent in the extension direction of the vertical support 2*a* of the ladder 2 (±z-axis direction in FIG. 1) and may cover the rear surface of the ladder 2.

Meanwhile, the cover portion 12 may include a first cover body 121 disposed on one of one side and the other side of the folding line 12*a*, and second cover body 122 disposed on the other of one side and the other side of the folding line 12*a* and having length different from the length of the first cover body 121.

In this case, the length a of the first cover body 121 may he set to he larger than the length b of the second cover body 122, whereby the cover portion 12 may have a shape in which one side and the other side thereof is asymmetric about the folding line 12*a*. In other words, when viewed from a lateral side, the first cover body 121 and the second cover body 122 may be connected to form a predetermined angle, and may be separated through the folding line 12*a*.

Meanwhile, the first cover body 121 and the second cover body 122 may be integrally formed. When the cover portion 12 is unfolded about the folding line 12*a*, one of the first cover body 121 and the second cover body 122, for example, the second cover body 122 may he disposed in a direction that deviates from the width direction of the horizontal supports 2*b* of the ladder 2. In contrast, when the cover portion 12 is unfolded about the folding line 12*a*, the other of the first cover body 121 and the second cover body 122, for example, the first cover body 121 may he disposed substantially parallel to the direction of the width e of the horizontal supports 2*b* of the ladder 2. In this case, since the length b of the second cover body 122 is set to be larger than the width e (see FIG. 4) of the horizontal supports 2*b* of the ladder 2, the area on which the user can step may be wider than that of the conventional ladder.

The fixing members 20 may serve to fix the guard member 10 to the ladder 2. To this end, the fixing members 20 may be connected to the guard member 10 and may be spaced apart along the length direction of the guard member 10.

The fixing member 20 includes a first fixing body 21 provided on one surface of connection portion 11 and configured to cover at least a part of the circumferential surface of the horizontal support 2*b* of the ladder 2, and a second fixing body 22 provided on one surface of the connection portion 11 to cover the rest of the circumferential surface of the horizontal support 2*b* of the ladder 2 and selectively engaged with the first fixing body 21. In this case, the first fixing body 21 may have a length greater than the thickness of the horizontal support 2*b*, and the second fixing body 22 may have a length substantially equal to or shorter than the length of the first fixing body 21. Accordingly, the first and second fixing bodies 21 and 22 may be engaged in a state in which at least some portions thereof are overlapped with each other.

Meanwhile, the first fixing body 21 and the second fixing body 22 may be sewn on one side of the connection portion 11. However, this is nothing more than an example, and this does not limit the spirit of the present disclosure. The first fixing body 21 and the second fixing body 22 may be bonded to one surface of the connection portion 11 by an adhesive, or the first fixing body 21 and the second fixing body 22 may be coupled to one surface of the connection portion 11 by thermal fusion or ultrasonic welding. For example, the first fixing body 21 may be a strap-shaped female Velcro tape, and the second fixing body 22 may be a strap-shaped male. Velcro tape. However, this is nothing more than an example, and this does not limit the spirit of the present disclosure. The first fixing body 21 may be provided as a female snap button, and the second fixing body 22 may be provided as a male snap button.

The reinforcing member 30 may prevent the guard member 10 from being separated from the ladder 2 by a user's load when the user's load is applied to the guard member 10 mounted on the ladder 2. To this end, the reinforcing member 30 may be provided at at least one end of the guard member 10. In addition, as the reinforcing member 30 is formed to have a length c greater than the width d of the guard member 10, at least one end of the reinforcing member 30 may make contact with the rear surface of the ladder 2, for example, the rear surface of the vertical support 2*a*. For example, the reinforcing member 30 may be formed in a rod shape having predetermined rigidity.

The reinforcing member 30 may be inserted into a reinforcing member insertion hole 111 provided in the connection portion 11. In this case, the reinforcing member insertion hole 111 may be formed by bending one end of the connection portion 11 in one direction and then connecting one end of the connection portion 11 to one surface of the connection portion 11.

In this case, the outer surface of the reinforcing member 30 may be in close contact with the inner surface of the reinforcing member insertion hole 111. If necessary, an adhesive or an arbitrary coupling means may be interposed between the outer surface of the reinforcing member 30 and the inner surface of the reinforcing member insertion hole 111, whereby the reinforcing member 30 can be further fixed to the guard member 10.

Hereinafter, the operations and effects of the safety device 1 for a ladder having the above-described configuration will he described with reference to FIGS. 4 and 5.

Referring to FIGS. 4 and 5, first, the user pulls at least one end of the guard member 10 folded about the folding line 12*a* in one direction so that the guard member 10 can he unfolded about the folding line 12*a*.

Next, the user arranges the first fixing body 21 on one side of the horizontal support 2*b* so that the first fixing body 21 covers at least a part of the horizontal support 2*b* of the ladder 2, and then arranges the second fixing body 22 on the other side of the horizontal support 2*b* so that the second fixing body 22 covers the rest of the horizontal support 2*b* of the ladder 2. By interconnecting the first fixing body 21 and the second fixing body 22 in this state, the guard member 10 is mounted on the ladder 2. At this time, the cover portion 12 of the guard member 10, i.e., the first cover body 121 and the second cover body 122 may be asymmetric about the folding line 12*a* when viewed from the lateral side, and may protrude toward the front side of the ladder 2.

Next, the user presses at least one of the first cover body 121 and the second cover body 122 disposed on the front side of the ladder 2 toward the rear side of the ladder 2. Thus, the first cover body 121 and the second cover body 122 disposed on the front side of the ladder 2 may protrude into an empty space existing between the two horizontal supports 2*b* adjacent in the length direction of the ladder 2, and may be disposed on the rear side of the ladder 2. In addition, the first cover body 121 and the second cover body 122 protruding toward the rear side of the ladder 2 may cover the rear surface of the ladder 2. For example, one of the first cover body 121 and the second cover body 122, the example, the second cover body 122 may be disposed in a direction that deviates from the horizontal support 2*b* of the ladder 2. The other of the first cover body 121 and the second cover body 122, for example, the first cover body 121 may be disposed in a direction substantially horizontal to the horizontal support 2*b* of the ladder 2.

Therefore, the first cover body 121 and the second cover body 122 arranged on the rear side of the ladder 2 can prevent the user's feet front falling toward the rear side of the ladder 2 in the process of the user going up and down the ladder 2.

In addition, the user uses the second cover body 122 as a footrest by stepping on the second cover body 122 having a length b greater than the width e of the horizontal support 2*b* of the conventional ladder 2, whereby the user can be prevented from slipping from the ladder 2.

The safety device 1 for a ladder as described above can be easily mounted on all ladders distributed tan the market, and can be compactly folded so as to have a minimized volume. This provides an effect that it is easy to store the safe device 1.

In addition, it is possible for infants and children to safely climb up and down a ladder without the help of a guardian. This provides an effect that it is possible to prevent safety accidents of users that may occur when using a ladder.

Hereinafter, a safety device 1' for a ladder according to another embodiment of the present disclosure will he described with reference to FIG. 6.

Referring to FIG. 6, a safety device 1' for a ladder according to another embodiment of the present disclosure may include a guard member 10', a plurality of fixing members 20 and a reinforcing member 30. The safety device 1' for a ladder shown in FIG. 6 is substantially the same as the safety device 1 for a ladder described with reference to FIGS. 1 to 3 except for the guard member 10'. Therefore, the guard member 10' corresponding to a difference will be mainly described, and the above description of the embodiment and reference numerals will be used for the same parts.

The guard member 10' may include a connection portion 11 and a cover portion 12' formed integrally with the connection portion 11. Each of the connection portion 11 and the cover portion 12' may be provided in plurality. The plurality of connection portions 11 and the plurality of cover portions 12' may be alternately arranged with each other. Since the connection portion 11 has been described with reference to FIGS. 1 to 3, redundant descriptions thereof will be omitted.

The cover portion 12' may include a first cover body 121' disposed on one of one side and the other side of the folding line 12*a*, and a second cover body 122 disposed on the other of one side and the other side of the folding line 12*a* and having a length different from that of the first cover body 121'.

Meanwhile, a dividing line 123 may be provided on one of the first cover body 121' and the second cover body 122. The dividing line 123 is formed on the first cover body 121' or the second cover body 122 to extend in the other direction or in a direction parallel to the folding line 12*a*, so that the first cover body 121' or the second cover body 122 can be divided into two parts. In this embodiment, a case where a first dividing line 123 is provided on the first cover body 121' will be described as an example. However, this does not limit the spirit of the present disclosure. The dividing line 123 may be provided on the second cover body 122.

The first cover body 121' may be provided so as to be folded or unfolded about the dividing line 123. To this end, the dividing line 123 may be formed as a sewing line sewn at an intermediate point in one direction, for example, the length direction of the first cover body 121'. Accordingly, the first cover body 121' may be divided into two parts about the dividing line 123, and the two parts may be symmetrical about the dividing line 123.

Meanwhile, in order for the first cover body 121' and the second cover body 122 disposed on the front side of the ladder 2 to protrude toward the rear side of the ladder 2 in a state in which the guard member 10' is mounted on the ladder 2 (see FIG. 1), at least one of the first cover body 121' and the second cover body 122 needs to be pressed toward the rear side of the ladder 2. Since the folding line 12*a* and the dividing line 123 are provided in such a manner as to be sewn to the cover portion 12', when the user presses at least one of the first cover body 121' and the second cover body 122 toward the rear side of the ladder 2, the folding line 12*a* and the dividing line 123 may be more easily deformed by an external force than the portions except the folding line 12*a* and the dividing line 123, i.e., the first cover body 121' and the second cover body 122. Accordingly, the first cover body 121' and the second cover body 122 can protrude toward the rear side of the ladder 2, whereby the guard member 10' can be more easily installed on the ladder 2.

In addition, when the safety device 1' for a ladder is not used, the guard member 10' may be stored by being folded about the folding line 12*a* and also about the dividing line 123. Therefore, the volume of the safety device 1' is further reduced, so that the safety device 1' can he easily stored in a small space.

While the embodiments of the present disclosure have been described above as specific examples, these embodiments are nothing more than examples. The present disclosure is not limited thereto, and should be construed as having, the widest scope in accordance with the basic idea disclosed herein. Those skilled in the art may combine or substitute the disclosed embodiments to implement a pattern of a shape not indicated herein. This also does not depart from the scope of the present disclosure. In addition, those skilled in the art may easily change or modify the disclosed embodiments based on the subject specification. It is apparent that such changes or modifications also belong to the scope of the present disclosure.

The invention claimed is:

1. A safety device for a ladder for protecting a user of the ladder, the ladder having a front side accessible to the user and a rear side disposed away from the user and behind a horizontal support of the ladder, comprising:

a guard member formed extending in a longitudinal direction, the guard member being mountable on the ladder; and a plurality of fixing members connected to the guard member, spaced apart from each other along the longitudinal direction of the guard member, and configured to fix the guard member to the ladder;

wherein the guard member includes:

a plurality of connection portions to which the fixing members are connected; and a plurality of cover portions, each cover portion disposed between a pair of adjacent connection portions, the cover portions being provided with a folding line extending in a direction perpendicular to the longitudinal direction, and configured to be unfolded about the folding line;

wherein, in a use configuration, each connection portion is disposed on a front surface of a corresponding horizontal support of the ladder at the front side of the ladder, the fixing members extend from the connection portion toward the rear side of the ladder, and the guard member extends in a rear direction from the front side of the ladder to the rear side of the ladder such that the folding line is disposed farther in the rear direction than the horizontal support of the ladder;

wherein, in an alternate mounted configuration, the guard member extends in a front direction from the front side of the ladder such that the folding line is disposed farther in the front direction than the horizontal support of the ladder;

wherein the guard member is movable between the use configuration and the alternate mounted configuration while being mounted on the ladder; and wherein the guard member is configured to fold about the folding line for storage.

2. The safety device of claim 1, wherein the connection portion and the cover portion are integrally formed.

3. The safety device of claim 1, the cover portion including:

a first cover body disposed on one side of the folding line; and a second cover body disposed on the other side of the folding line and having a length different from a length of the first cover body.

4. The safety device of claim 3, wherein, when the cover portion is unfolded about the folding line, the first cover body and the second cover body are formed asymmetrically around the folding line.

5. The safety device of claim 4, wherein, when the cover portion is unfolded about the folding line, one of the first cover body and the second cover body is disposed in a direction being different from a width direction of a horizontal support of the ladder.

6. The safety device of claim 3, wherein one of the first cover body and the second cover body is provided with a dividing line extending in the direction perpendicular to the longitudinal direction.

7. The safety device of claim 1, further comprising:

a reinforcing member provided to at least one end of the guard member, wherein at least one end of the reinforcing member is configured to be in contact with a rear surface of the ladder.

8. The safety device of claim 7, wherein the reinforcing member has a length greater than a width of the guard member.

9. A safety device for a ladder for protecting a user of the ladder, the ladder having a front side accessible to the user and a rear side disposed away from the user and behind a horizontal support of the ladder, comprising:

a guard member formed extending in a longitudinal direction, the guard member being mountable on the ladder; and a plurality of fixing members connected to the guard member, spaced apart from each other along the longitudinal direction of the guard member, and configured to removably couple the guard member to the ladder, wherein the at least one of the fixing members further comprises:

a first fixing body provided on a first surface of a connection portion and configured to cover at least a portion of a circumferential surface of a horizontal support of the ladder; and a second fixing body provided on the first surface of the connection portion configured to cover at least a portion of the circumferential surface of the horizontal support of the ladder that is not covered by the first fixing body, and the second fixing body configured to be selectively engaged with the first fixing body;

wherein the guard member is configured to protrude at least partially toward a rear side of the ladder and cover a rear surface of the ladder, and wherein the guard member includes:

the connection portion to which the fixing members are connected; and a cover portion provided on at least one of both ends of the connection portion and provided with a folding line extending in a direction perpendicular to the longitudinal direction, and configured to be unfolded about the folding line;

the connection portion is disposed on a front surface of a corresponding horizontal support of the ladder at the front side of the ladder, the fixing members extend from the connection portion toward the rear side of the ladder, and the guard member extends in a rear direction from the front side of the ladder to the rear side of the ladder such that the folding line is disposed farther in the rear direction than the horizontal support of the ladder;

wherein, in an alternate mounted configuration, the guard member extends in a front direction from the front side of the ladder such that the folding line is disposed farther in the front direction than the horizontal support of the ladder; and wherein the guard member is movable between the use configuration and the alternate mounted configuration while being mounted on the ladder.

10. The safety device of claim 9, wherein the connection portion and the cover portion are provided in plural, respectively, and the plurality of connection portions and the plurality of cover portions are alternately arranged to each other along a longitudinal axis of the cover portion and the plurality of connection portions and the plurality of cover potions are integrally formed.

* * * * *